United States Patent Office 3,453,310
Patented July 1, 1969

3,453,310
PREPARATION OF ETHER-CONTAINING
ISOCYANATES
Karl-Friedrich Zenner and Günter Oertel, Cologne-Flittard, and Hans Holtschmidt, Leverkusen, Germany, assignors to Farbenfabriken Bayer Aktiengesellschaft, Leverkusen, Germany, a corporation of Germany
No Drawing. Filed Feb. 25, 1965, Ser. No. 435,369
Claims priority, application Germany, Feb. 26, 1964, F 42,127
Int. Cl. C07c 119/04
U.S. Cl. 260—453                                   17 Claims

ABSTRACT OF THE DISCLOSURE

Organic ether containing isocyanates are prepared by reacting together α-halogen alkyl ethers with alkali metal, alkaline earth metal or ammonium cyanates in a solvent mixture containing a highly polar solvent and a saturated hydrocarbon solvent. The organic ether containing isocyanates are intermediates for the production of pesticides and pharmaceuticals.

---

This invention relates to novel methods for the preparation of organic isocyanates and in particular to the preparation of isocyanates containing an ether group.

Heretofore, organic isocyanates have been prepared by the reaction of amine salts with phosgene. This method is generally effective where simple isocyanates are desired. However, where more complex isocyanates are desired, the process becomes expensive due to the difficulty and expense involved in obtaining the appropriate diamine. Moreover, the phosgenation reaction employs dangerous and toxic materials and is difficult to control and does not give good yields in all cases. It is known that organic isocyanates can be prepared by reacting organic sulfates with alkali metal cyanates. However, due to the presence of sulfur dioxide resulting from decomposition of the sulfate, the isocyanate has a tendency to polymerize, resulting in low yields. It is also known that alkyl halides can be reacted with heavy metal cyanates such as silver or mercury cyanates. Attempts have been made to replace the silver and mercury cyanates in these reactions with alkali metal cyanates. However, these investigations have not met with much success since these materials are less reactive and the products produced in most instances are not the isocyanates but the isocyanurates. It is known that isocyanates are obtained in poor yields from alkyl halides and alkali metal or alkaline earth metal isocyanates at elevated temperatures in the presence of polar solvents such as acetonitrile, dimethyl formamide, diphenyl sulphone, tertiary amides or acetone. In order to suppress the simultaneous formation of isocyanurates, the reaction conditions, especially the temperature must be so adjusted that the monomeric isocyanates formed can rapidly be removed from the equilibrium. Since the reaction between the alkyl halide and the alkali metal or alkaline earth metal cyanate is relatively slow, useful yields of monomeric isocyanates can only be obtained in an extremely slow conversion. It has already been attempted to suppress the formation of the isocyanurates by sudden quenching of the reaction mixture after a brief reaction period. The isocyanate yields remain consistently low in this process, since, in addition to unreacted starting material, a considerable amount of isocyanurates are obtained. Moreover, all of these processes have the disadvantage that the isolation of the monomeric isocyanate requires a costly separation of the unreacted alkyl halide which has a similar boiling point.

Therefore, it is an object of this invention to provide means for obtaining good yields of organic isocyanates. Another object of this invention is to provide means for obtaining organic isocyanates directly from alkali metal cyanates. Another object of this invention is to provide means for obtaining organic isocyanates from alkaline earth metal cyanates. Another object of this invention is to provide a means for obtaining organic isocyanates from ammonium cyanates. Still another object of this invention is to provide a means for rapidly converting halogen containing compounds to organic isocyanates. Still another object of this invention is to provide a method for preparing ether containing isocyanates. Still another object of this invention is to provide a method for preparing an organic isocyanate having an ether group in the alpha position relative to the NCO group. A further object of this invention is to provide a method for preparing isocyanates without the formation of isocyanurates. A still further object of this invention is to form isocyanates without continuously removing the isocyanate formed from the reaction medium. A still further object of this invention is to provide a method for preparing organic isocyanates in high yield and purity.

The above and other objects of this invention are accomplished generally by reacting alkali metal cyanates, alkaline earth metal cyanates, ammonium cyanates thereof with an alpha-haloether having the general formula

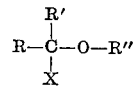

wherein R and R' represents an organic radical having from 1 to 16 carbon atoms, or hydrogen, X represents halogen; and R" represents an organic radical having from 1 to 16 carbon atoms in the presence of a solvent mixture comprising a polar solvent and an organic hydrocarbon solvent. The organic radicals represented by R, R' and R" in the above formula may be the same or different, saturated or unsaturated, substituted or unsubstituted, and may be alkyl, aryl, cycloalkyl, alkenyl, alkdienyl and the like.

Briefly, the synthesis is achieved by reacting an alkali metal cyanate or an alkaline earth metal cyanate or an ammonium cyanate with an alpha-haloalkyl ester having a halogen group bonded to an alpha-alkyl carbon atom, the reaction being conducted in the presence of a solvent comprising a mixture of a strongly polar solvent and an organic hydrocarbon solvent to form a compound having the general formula

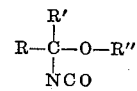

wherein R and R' represents an organic radical having from 1 to 16 carbon atoms, or hydrogen and R" represents an organic radical having from 1 to 16 carbon atoms. The organo radicals may be the same or different, saturated or unsaturated, substituted or unsubstituted, and may be alkyl, aryl, cycloalkyl, alkdienyl and the like. In the above formula R, R' and R" may be the same or different organic radicals having substituted groups such as nitro groups, halogen groups, cyano groups and alkoxy groups having from 1 to 6 carbon atoms. R, R' and R" may be alkyl groups having from 1 to 16 carbon atoms, preferably having from 1 to 8 carbon atoms, such as methyl, ethyl, propyl, butyl, hexyl, pentyl, heptyl, octyl, decyl, dodecyl, tridecyl, tetradecyl, hexadecyl and the like. Also, R, R' and R" may be aryl groups having from 6 to 12 carbon atoms such as, for example, phenyl, alpha-naphthyl, β-naphthyl and the like; alkaryl radicals such as tolyl, xylyl, cumenyl, ethylphenyl and the like; aralkyl radicals such as phenyl-methyl, phenyl-ethyl, phenylpropyl, phenyl-butyl, naphthyl-methyl, and cycloalkyl groups such as cyclohexyl, cycloheptyl, cyclooctyl and the like. Other groups which may be substituted on R″ above are alkoxy groups such as methoxy, ethoxy, propoxy, butoxy and the like. R, R′ and R″ may be unsaturated organic radicals such as 1-propenyl, 2-butenyl, 1,3-butadienyl, 2-pentenyl, and the like. More specifically compounds are formed which conform to the following general formula

R—O—CH₂—NCO wherein R is selected from the group consisting of an alkyl radical having from 1 to 12 carbon atoms, Cl—CH₂—CH₂— and CH₂=CH—CH₂— radical. These compounds are prepared from α-halomethylalkyl ethers of the general formula

R—O—CH₂—X wherein R is selected from the group consisting of an alkyl radical having from 1 to 12 carbon atoms, Cl—CH₂—CH₂— and CH₂=CH—CH₂— radical and X represents a halogen selected from the group consisting of chlorine and bromine. Also included are alkyl-alpha-isocyanatoethyl ethers of the general formula $$\text{R—O—CH—CH}_3$$
$$\quad\quad\quad |$$
$$\quad\quad\quad \text{NCO}$$

wherein R is selected from the group consisting of an alkyl radical having 1 to 12 carbon atoms and a CH₂=CH—CH₂— radical. These compounds are prepared from alpha-haloethylalkyl ethers of the general formula $$\text{R—O—CH—CH}_3$$
$$\quad\quad\quad |$$
$$\quad\quad\quad \text{X}$$

wherein R is selected from the group consisting of an alkyl radical having 1 to 12 carbon atoms and a

CH₂=CH—CH₂ radical and X is a halogen selected from the group consisting of chlorine and bromine. More specifically, an ethyleneglycol-bis-alpha-isocyanate ethyl ether of the formula $$\text{CH}_3\text{—CH—O—CH}_2\text{—CH}_2\text{—O—CH—CH}_3$$
$$\quad\quad |\quad\quad\quad\quad\quad\quad\quad\quad\quad\quad |$$
$$\quad\text{NCO}\quad\quad\quad\quad\quad\quad\quad\text{NCO}$$

may be prepared from an ethyleneglycol-bis-alpha-halogenethyl ether of the formula $$\text{CO}_3\text{—CH—O—(CH}_2)_2\text{—O—CH—CH}_3$$
$$\quad\quad |\quad\quad\quad\quad\quad\quad\quad\quad\quad\quad |$$
$$\quad\text{X}\quad\quad\quad\quad\quad\quad\quad\quad\text{X}$$

wherein X represents a halogen radical selected from the group consisting of chlorine and bromine.

Suitable mono- and polyvalent alpha-chloro, alpha-bromo and alpha-iodo ethers which may be reacted with alkali metal or alkaline earth metal or ammonium cyanates according to this invention are, for example, chloromethyl methyl ether, bromomethyl methyl ether, iodomethyl methyl ether, chloromethyl 2-fluoroethyl ether, chloromethyl 2-chloroethyl ether, chloromethyl 2-bromoethyl ether, chloromethyl 2-iodoethyl ether, bromomethylpropyl ether, iodomethylpropyl ether, chloromethyl 2-nitrobutyl ether, chloromethyl 2-methylpropyl ether, chloromethyl-isobutyl ether, chloromethyl 2-methyl-2-nitrobutyl ether, chloromethyl octadecyl ether, chloromethyl benzyl ether, bromomethyl benzyl ether, chloromethyl m-nitrobenzyl ether, chloromethyl 2-phenylethyl ether, chloromethyl allyl ether, bromomethyl allyl ether, chloromethyl 1-methyl-ethyl ether, bromomethyl 1-methylethyl ether, iodomethyl 1-methylethyl ether, chloromethyl cyclohexyl ether, 1-chloroethyl methyl ether, 1-bromoethyl methyl ether, 1-chloroisopropyl methyl ether, 1-chloromethyl 2-chloroethyl ether, 1-chloromethyl dodecyl ether, 1-chloroethyl allyl ether, 1-bromoethyl allyl ether, 1-chloroethyl-n-butyl ether, 1-bromoethyl-n-butyl ether, 1-chloroethyl-isobutyl ether, 1-chloroethyl-dodecyl ether, 1-chloropropyl methyl ether, 1-chloropropyl 2-chloroethyl ether, 1-chloropropyl allyl ether, 1,3-dichloropropyl methyl ether, 1,3-dichloropropyl ethyl ether, 1,3-dibromopropyl allyl ether, 1-chlorobutyl methyl ether, 1-chlorobutyl 2-chloroethyl ether, alpha-chlorobenzyl methyl ether, alpha-chloro-p-methoxybenzylmethyl ether, alpha-bromobenzyl ethyl ether, alpha-p-dichlorobenzyl methyl ether, alpha - chloro - p - nitrobenzyl methyl ether, 1-chloro-3-phenylallyl methyl ether, ethylene glycol 1,2-bis-chloromethyl ether, hexamethylene glycol 1,6-bis-chloromethyl ether, butylene glycol 1,4-bis-chloromethyl ether, butylene glycol 1,3-bis-chloromethyl ether, isobutylene glycol 1,3-bis-chloromethyl ether butene-2-diol 1,4-bis-chloromethyl ether chloromethyl phenyl ether, chloromethyl 4-methoxyphenyl ether, 1,3-dichloro-1,3-dimethoxypropane, 1,4-dichloro-1,4-diethoxybutane, 1,5-dichloro-1,5-dimethoxypentane, chloromethyl - 3 - phenylpropyl ether, 2-chloro-dioxane-1,4, 2,5-dichloro-dioxane-1,4, 2-chlorotetrahydrofuran, 2-chlorotetrahydropyran, chloromethyl-1-naphthyl ether, chloromethyl 2-naphthyl ether, 1-chloroethyl phenyl ether, 1-bromoethyl phenyl ether, glycerin-tris-chloromethyl ether, alpha, alpha′-dichloro-p-xylylene methyl ether and the like.

The cyanates which may be employed include the alkali metal cyanates such as those of sodium, potassium, and lithium, and the alkaline earth metal cyanates such as those of calcium, magnesium, strontium and barium. In addition to the metal cyanates described above, ammonium cyanates such as ammonium-, methylammonium-, dimethylammonium, trimethylammonium and triethylammonium cyanates may be used in this process. Primarily because of greater availability, the alkali metal cyanates, particularly sodium cyanate, are preferred.

In the formation of the organic isocyanates, the alkali metal or ammonium or alkaline earth metal cyanates are reacted with alpha-haloethers in the presence of a mixture of organic solvents.

One of the components of the solvent mixture is a hydrocarbon such as aliphatic, cycloalphatic, araliphatic, or aromatic hydrocarbons, preferably having less than 25 carbon atoms. Examples of these organic hydrocarbon solvents are toluene, benzene, xylene, mesitylene, diethyl benzene, isopropylbenzene, methyl naphthalene, octane, ligroin, gasoline, cyclohexane, methyl cyclohexane and chlorinated benzenes such as monochlorobenzene, dichlorobenzene and the like. The other component of the solvent mixture is a highly polar solvent such as, for example, nitroethane, nitropropane, nitrobenzene, nitrotoluene, acetone, acetophenone and tetramethyl urea. Other polar solvents which may be special employed are tertiary amides of mono- and polycarboxylic acids having from about 1 to 15 carbon atoms. Examples of these include dimethyl formamide, diethyl formamide, diisopropyl formamide, diphenyl formamide, methyl ethyl formamide, methyl phenyl formamide, dimethyl acetamide, methyl ethyl acetamide, dicyclohexyl acetamide, ethyl cyclohexyl acetamide, ethyl phenyl acetamide and methyl benzyl propionamide, and cyclic tertiary amides such as N-methyl pyrrolidone, N-isopropyl pyrrolidone, N-methyl piperidone, N-cyclohexyl piperidone and N-methyl caprolactam.

Other polar solvents which may be special employed are nitriles of mono- and polycarboxylic acids having up to about 12 carbon atoms such as, for example, acetonitril, propionitril, 3-methoxypropionitril, 4-chloro-butyronitril, cyclohexyl cyanide, benzyl cyanide, benzonitril, succinic acid dinitrile and adipic acid dinitrile.

In addition to the above, other polar solvents which may be employed in the formation of the isocyanates are the aliphatic, cycloaliphatic, araliphatic and aromatic sulphones such as, for example, dimethyl sulphone, methyl ethyl cyclohexyl sulphone, methyl benzyl sulphone, methyl phenyl sulphone, tetramethylene sulphone, pentamethylene sulphone and diphenyl sulphone.

The preferred polar solvents are tertiary amides, carboxylic acid nitrile, dialkyl, dicycloalkyl, arylkyl and diaryl sulphones.

The term "highly polar" as used herein covers solvents which have a dielectric constant greater than 15 and do not contain Zerewitinoff type active hydrogen.

The ratio of the highly polar solvent to the organic hydrocarbon solvent may range from about 0.01 to about 80% by volume of of the polar solvent to about 99.99 to about 20% by volume of the organic hydrocarbon solvent.

The proportions of the reactants can be varied over a wide range, that is, both of the reactants can be used in equal molar proportions or either the cyanate or the alpha-haloether can be in excess of between about 0.5 to 25 mol percent or higher. It is preferred that the molar ratio between the cyanate and the alpha-haloether be so chosen that there is at least stoichiometric equivalence between the alpha-haloether group and the cyanate. If an excess of either of the reactants is employed, it is preferred that the cyanate be used.

The temperature at which the reaction is conducted is also varied over a wide range as between 0° C. and about 200° C. Reaction will occur at room temperature; however, optimum temperatures have been found to be between about 50° C. and 150° C. The pressure employed is generally atmospheric but can be as high as 5000 p.s.i. and higher. The length of the reaction time depends primarily upon the nature of the alpha-haloether and is in general from about 0.1 to about 20 hours.

Since the reaction between the alpho-haloether and the cyanate is essentially quantitative with respect to the alpha-haloether employed, the problem of separating the final products from the starting materials is relatively simple. The isocyanates thus formed during the conversion can be isolated by general techniques such as by filtering off the inorganic salts and separating the isocyanate from the filtrate by distillation or by distilling the isocyanate directly from the reaction mixture. Since the formation of isocyanurates is almost completely suppressed under the conditions of this process, it is no longer necessary to continuously remove the isocyanate formed from the reaction mixture together with unreacted material, nor is it necessary to chill the reaction mixture after a brief reaction period in order to obtain practical yields of isocyanate as was necessary in the prior process. Consequently, the isocyanates may be recovered by the conventional techniques. The isocyanates thus obtained are, in general, colorless, more or less viscous liquids of high purity. They may be stored indefinitely in the absence of air and moisture.

In the formation of the organic isocyanates the alpha-haloether may either be heater together with the cyanate in the solvent mixture or they may be added in portions to a suspension of the cyanate in the solvent mixture. Since the alkali metal, ammonium or alkaline earth metal cyanates are essentially insoluble in the reaction medium, they are generally introduced in a finely divided form.

The invention is further illustrated but is not intended to be limited by the following examples in which all parts and percentages are by weight unless otherwise specified.

EXAMPLE 1

Approximately 80 parts of sodium cyanate are suspended in 400 parts by volume of dimethyl formamide or xylene or in 400 parts by volume of a mixture of dimethyl formamide and xylene in variable proportions and about 81 parts of chloromethyl methyl ether are dissolved in the solvent or solvent mixture. The mixture is boiled until the conversion of the halogen is completed and is then cooled. After filtering off the inorganic salts, the methoxymethyl isocyanate formed is separated from the solvent by distillation. The table below indicates the yield for solvent mixtures of various compositions. The methoxymethyl isocyanate is a colourless, mobile liquid, having a boiling point of 89 to 90° C. and $n_D^{20}$: 1.3990. Its NCO-content is 48.2% by weight (calculated: 48.2%).

| Solvent mixture | | Reaction period in hours | Chloromethyl methyl ether conversion in percent | Yield of methoxymethyl isocyanate as percent of the theoretical |
| --- | --- | --- | --- | --- |
| Vol. percent dimethyl formamide | Vol. percent xylene | | | |
| 100 | --- | ½ | 100 | 0 |
| 25 | 75 | 2½ | 99 | 72 |
| 12.5 | 87.5 | 3 | 99 | 77 |
| 6.3 | 93.7 | 3 | 99 | 82 |
| 2.5 | 97.5 | 3 | 99 | 82 |
| 1.0 | 99 | 5 | 99 | 83 |
| 0.1 | 99.9 | 5½ | 99 | 86 |
| --- | 100 | 7 | 1 | 0 |

EXAMPLE 2

Approximately 81 parts of chloromethyl methyl ether and about 80 parts of soduim cyanate are reacted as in Example 1 in mixtures of N-methylpyrrolidone and xylene in various proportions.

| Solvent mixture | | Reaction period in hours | Chloromethyl methyl ether conversion in percent | Yield of methoxymethyl isocyanate as percent of the theoretical |
| --- | --- | --- | --- | --- |
| Vol. percent N-methyl-pyrrolidone | Vol. percent xylene | | | |
| 100 | --- | 1 | 100 | 0 |
| 25 | 75 | 1 | 99 | 55 |
| 12.5 | 87.5 | 3 | 99 | 70 |
| 6.3 | 93.7 | 3 | 99 | 76 |
| 1 | 99 | 6 | 99 | 82 |
| 0.1 | 99.9 | 6 | 99 | 83 |

EXAMPLE 3

Approximately 81 parts of chloromethyl methyl ether and about 80 parts of sodium cyanate are reacted as in Example 1 in mixtures composed of tetramethylene sulphone and xylene in various proportions.

| Solvent mixture | | Reaction period in hours | Chloromethyl methyl ether conversion in percent | Yield of methoxy methyl-isocyanate as percent of the theoretical |
| --- | --- | --- | --- | --- |
| Vol. percent tetra methylene sulphone | Vol. percent xylene | | | |
| 100 | --- | 1 | 100 | 0 |
| 25 | 75 | 2 | 99 | 71 |
| 12.5 | 87.5 | 2½ | 99 | 80 |
| 6.3 | 93.7 | 3 | 99 | 86 |
| 2.5 | 97.5 | 3½ | 99 | 83 |
| 1 | 99 | 7 | 99 | 83 |
| 0.1 | 99.9 | 7 | 99 | 93 |

EXAMPLE 4

Approximately 81 parts of chloromethyl methyl ether and 80 parts of sodium cyanate are reacted as in Example 1 in either 400 parts by volume of acetonitrile or in 400 parts by volume of a mixture composed of acetonitrile and benzene. The whole of the reaction mixture is distilled after removal of the inorganic salts and the yield of methoxymethyl isocyanate is determined by analyzing the NCO-content of the distillate.

| Solvent mixture | | Reaction period in hours | Chloromethyl methyl ether conversion in percent | Yield of methoxymethyl isocyanate as percent of the theoretical |
| --- | --- | --- | --- | --- |
| Vol. percent aceto-nitrile | Vol. percent benzene | | | |
| 100 | --- | 4 | 100 | 0 |
| 25 | 75 | 8 | 99 | 77 |
| 12.5 | 87.5 | 12 | 99 | 74 |
| 6.3 | 93.7 | 15 | 99 | 68 |
| --- | 100 | 15 | 1 | 0 |

EXAMPLE 5

700 parts of sodium cyanate are suspended in a mixture of 500 parts by volume of benzonitrile and 1000 parts by volume of mesitylene; 648 parts of chloromethyl methyl ether are then added. The mixture is boiled under reflux while stirring until all the chlorine of the chloromethyl methyl ether has reacted (12 hours). The methoxymethyl isocyanate formed is then distilled off directly from the reaction mixture and, after fractional distillation through a column, there are obtained 585 parts of methoxymethyl isocyanate having the properties described above. The yield is 84% of the theoretical.

EXAMPLE 6

200 parts of sodium cyanate are suspended in a mixture consisting of 20 parts by volume of N-methylpyrrolidone and 300 parts by volume mesitylene, and 162 parts of chloromethyl methyl ether are added. The replacement of chlorine is complete after boiling under reflux for 4 hours. The methoxymethyl isocyanate can be distilled off directly from the reaction mixture as described in Example 1 and a yield of 86% of the theoretical is achieved. Using tetramethylene sulphone or dimethyl formamide as the polar component of the solvent mixture methoxy methyl isocyanate is obtained with yields of over 80% of theoretical.

EXAMPLE 7

100 parts of soduim cyanate are suspended in a mixture of 200 parts by volume of acetonitrile and 200 parts by volume of benzene and 106.5 parts of allyl chloromethyl ether are added. The replacement of chlorine is complete after boiling for 12 hours. The inorganic salts are filtered off, the acetonitrile-benzene mixture is distilled off from the filtrate at normal pressure or at a slightly reduced pressure, leaving 79 parts of allyloxymethyl isocyanate having the formula $$CH_2=CH_2-CH_2-O-CH_2-NCO$$

in a yield of 70% of the theoretical, having a boiling point of 60–61°/95 torr B.P. 131° C./760 torr and $n_D^{20}$ : 1.4289.

EXAMPLE 8

400 parts of sodium cyanate are suspended in a mixture consisting of 300 parts by volume of propionitrile and 700 parts by volume of xylene and 318 parts of ethylene glycol bis-(chloromethyl) ether are added. The charge is boiled under reflux while stirring until all the chlorine has been reacted (about 16 hours). The inorganic salts are then filtered off, the filtrate is evaporated in vacuo and the residue is distilled under reduced pressure. There are obtained 233 parts of ethylene gylcol bis-(isocyanatomethyl) ether having the formula $$OCN-CH_2-O-CH_2-CH_2-O-CH_2-NCO$$

with a boiling point of 80–81° C./0.1 torr and $n_D^{20}$: 1.4584, corresponding to a yield of 68% of theoretical.

EXAMPLE 9

283 parts of ethyl chloromethyl ether are reacted as in Example 1 with 250 parts of sodium cyanate in a mixture of 400 parts by volume of benzonitrile and 800 parts by volume of benzene is boiled under reflux. After 5 of thoxymethyl isocyanate of B.P. 107° C., corresponding to a yield of 78% of theoretical $n_D^{20}$ : 1.4038.

EXAMPLE 10

A mixture of approximately 245 parts of chloromethyl-isobutyl ether, about 180 parts of sodium cyanate, about 200 parts by volume of acetonitrile and about 200 parts by volume of benzene is boiled after reflux. After 5 hours all the chlorine has been reacted. After filtering off the inorganic salts the solvent mixture is distilled at atmospheric pressure or at a slightly reduced pressure through a small column. Upon vacuum distillation of the residue there are obtained about 218 parts of isobutoxymethyl isocayanate having the formula

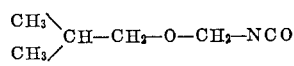

of the boiling point of 40 to 41° C./12 mm. Hg, $n_D^{20}$: 1.4110; corresponding to a yield of about 88% of theoretical; NCO-content: 32.4% (calculated 32.5%).

EXAMPLE 11

A mixture of approximately 350 parts of dodecylchloromethyl ether, about 140 parts of sodium cyanate, about 350 parts by volume of propionitrile and 350 parts by volume of toluene is boiled under reflux for about 7 hours. The product was recovered according to the procedure described in Example 6. About 302 parts of dodecyloxymethyl isocyanate having the formula $$n-C_{12}H_{25}-O-CH_2-NCO$$

was recovered having a boiling point of 124° C./0.5 mm. Hg $n_D^{20}$ : 1.4418 and corresponding to a yield of about 84% of theoretical; NCO-content: 17.4% (calculated: 17.4%).

EXAMPLE 12

A mixture of approximately 306 parts of 2-chloroethyl-chloromethyl ether, about 180 parts of sodium cyanate, about 200 parts by volume of acetonitrile and 200 parts by volume of toluene is boiled under reflux for about 14 hours. The product was recovered according to the procedure described in Example 6. About 248 parts of 2-chloroethyloxymethyl isocyanate having the formula $$Cl-CH_2-CH_2-O-CH_2-NCO$$

was recovered having a boiling point of 74° C./12 mm. Hg $n_D^{20}$ : 1.4540 and corresponding to a yield of about 77% of theoretical; NCO-content 30.8% (calculated 31.0%).

EXAMPLE 13

A mixture of approximately 217 parts of α-chlorodiethyl ether, about 150 parts of sodium cyanate, about 300 parts by volume of acetonitrile and about 400 parts by volume of benzene is boiled under reflux for about two hours. After that time any ioniziable chlorine can no longer be deducted in the brown coloured solution. The product was recovered according to the procedure described in Example 6. About 195 parts by weight of α-isocyanatodiethyl ether was recovered having a boiling point of about 53 to 55° C./100 mm. Hg $n_D^{20}$: 1.3984. This corresponds to a yield of about 82% of theoretical; NCO-content 36.5% (calculated 36.5%).

EXAMPLE 14

A mixture of approximately 273 parts of α-chloroethyl-n-butyl ether, about 150 parts of sodium cyanate, about 320 parts by volume of acetonitrile and about 480 parts by volume of benzene is boiled under reflux for 1½ hours. After that time ioniziable chlorine can be detected in the brownish colour solution. The product was recovered according to the procedure described in Example 6. About 252 parts of α-isocyanatoethyl-n-butyl ether was recovered having a boiling point from about 51 to 52° C./15 mm. Hg $n_D^{20}$: 1.4107; which corresponds to a yield of about 88% of theoretical; NCO-content: 29.3% (calculated 29.3%).

EXAMPLE 15

A mixture of approximately 187 parts of ethyleneglycol-bis-chloroethyl ether, about 160 parts of sodium cyanate, about 300 parts by volume of propionitrile and about 300 parts by volume of toluene is boiled under reflux for about 5 hours until all the chlorine has been reacted. The mixture, which has become a dark brown colour was recovered according to the procedure described in Example 6. About 148 parts of ethyleneglycol-bis-α-isocyanatoethyl ether was obtained having a boiling point from about 69 to 70° C./1 mm. Hg. $n_D^{20}$: 1.4372 which corresponds to a yield of about 74% of theoretical; NCO-content: 41.8% (calculated 42.0%).

EXAMPLE 16

A mixture of approximately 158 parts of α-chlorotetrahydropyrane, about 100 parts of sodium cyanate, about 250 parts by volume of acetonitrile and about 250 parts by volume of benzene is slowly heated up with stirring. At the end of the exothermic reaction it is refluxed for about one hour. The product was recovered according to the procedure described in Example 6. About 73 parts (60% of theoretical) of tetrahydropyranyl-α-isocyanate was obtained B.P. from about 47 to 48° C./11 mm. Hg. $n_D^{20}$: 1.4500; NCO-content: 33.0% (calculated 33.0%).

EXAMPLE 17

A mixture of approximately 309 parts of chloromethyl-3-phenylpropyl ether, about 130 parts of sodium cyanate, about 400 parts by volume of propionitrile and about 400 parts by volume of ethylenebenzene is boiled at reflux temperatures for 6 hours. The product was recovered according to the procedure described in Example 6. About 288 parts (90% of theoretical) of 3-phenylpropyloxymethyl isocyanate having the formula

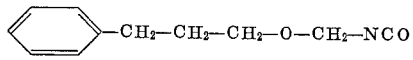

was recovered having a boiling point of about 92 to 93° C./0.1 mm. Hg. $n_D^{20}$: 1.5061; NCO-content; 22.0% (calculated 22.0%).

EXAMPLE 18

A mixture of approximately 161 parts of chloromethylmethyl ether, about 200 parts of potassium cyanate, about 100 parts by volume of tetramethylene sulfone and about 300 parts by volume of diethylbenzene is boiled at reflux temperatures for 12 hours, until all the chlorine of chloromethylmethyl ether has been reacted. The product was recovered according to the procedure described in Example 5. Methoxymethyl isocyanate was obtained in a yield of about 63% of theoretical.

EXAMPLE 19

A mixture of approximately 120 parts of chloromethylmethyl ether, about 85 parts of lithium cyanate, about 80 parts by volume of benzonitrile and about 400 parts by volume of cumene is boiled at reflux temperatures for 4 hours, until all the chlorine has been reacted. The product was recovered according to the procedure described in Example 5, wherein methoxymethyl isocyanate was obtained in a yield of about 81% of theoretical.

EXAMPLE 20

A mixture of approximately 81 parts of chloromethylmethyl ether, about 80 parts of calcium cyanate containing about 5% by weight of calciumcarbonate, about 100 parts by volume of benzonitrile and about 300 parts by volume of cumene is boiled under reflux for about 17 hours. The product was recovered according to the procedure described in Example 5, wherein methoxymethyl isocyanate in a yield of about 55% of theoretical was obtained.

EXAMPLE 21

A mixture of approximately 81 parts of chloromethylmethyl ether, about 70 parts of ammonium cyanate, about 50 parts by volume of benzonitrile and about 250 parts by volume of cumene is stirred at about 60° C. for about 19 hours. The inorganic salts are filtered off and methoxymethyl isocyanate is obtained from the filtrate by fractional distillation through a column in a yield of about 42% of theoretical.

EXAMPLE 22

A mixture of approximately 117 parts of bromomethylmethyl ether, about 75 parts of sodium cyanate, about 40 parts by volume of benzonitrile and about 200 parts by volume of cumene is boiled under reflux for about 9 hours until all the bromine has been reacted. The product was recovered according to the procedure described in Example 5. Methoxymethyl isocyanate in a yield of about 51% of theoretical was obtained.

EXAMPLE 23

A mixture of approximately 106 parts of α-chlorobenzylmethyl ether, about 65 parts of sodium cyanate, about 250 parts by volume of benzene and about 250 parts by volume of acetonitrile is stirred in a water bath at 65° C. for about 3 hours. The product was recovered according to the procedure described in Example 6. About 94 parts of α-isocyanatobenzylmethyl ether having the formula

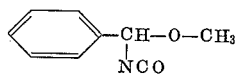

(89% of theoretical) was recovered having a boiling point of 59 to 60° C./0.2 mm. Hg. $n_D^{20}$: 1.5093; NCO-content 25.1% (calculated: 25.7%).

The smooth formation of isocyanates containing an ether group in the alpha-position relative to the NCO group, from alpha-haloethers and alkali metal or alkaline earth metal cyanates is extremely surprising. As was shown in Examples 1 through 4, alpha-haloethers yield, with alkali metal or alkaline earth metal cyanates, only trimeric or polymeric isocyanates under the conditions of all the known processes mentioned above, in pure, highly polar solvents as reaction medium. However, when a mixture or organic solvents containing a strongly polar solvent and a hydrocarbon solvent are employed as a reaction medium, high yields of organic isocyanates are obtained.

The products produced by the process of this invention are of considerable utility. For example, the isocyanates are intermediates in the preparation of pesticides and pharmaceuticals.

The α-alkoxyalkyl isocyanates are valuable intermediates for the production of insecticides, especially for the production of O,O-dimethyl-dithiophosphoryl acetic acid-N-methoxymethyl amide. To a solution of 21.6 parts by weight of O,O-dimethyl-dithiophosphoryl acetic acid in 10 parts by volume of methylenchloride are dropped at 40° C. 8.7 g. methoxymethyl isocyanate. An exothermic reaction starts under evolution of carbon dioxide. When the carbon dioxide development has ceased, the solvent is distilled off from the reaction mixture under reduced pressure. There remain 24 parts by weight of O,O-dimethyldithiophosphoryl acetic acid-N-methoxymethyl amide as a yellow oil, which crystallizes on standing. Melting point 40 to 41° C. This compound is a highly effective insecticide and acaricide. Aqueous dilutions of O,O-dimethyl-dithiophosphoryl acetic acid-N-methoxymethyl amide have been prepared by mixing with the same amount of dimethylformamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration. The aphids are killed to a rate of 100% by a 0.01% solution of the above mentioned compound. The effect against sucking insects can be seen from the example of *Herzinothrips femoralis*: A 100% killing rate is already obtained at a concentration of 0.025% after three days and after 10 days in the case of a renewed infection. The biological efficiency for further compounds of this type can be seen from the DAS No. 1,138,977.

Although the invention has been described in considerable detail in the foregoing, it is to be understood that such detail is solely for the purpose of illustration and that many variations can be made by those skilled in the art without departing from the spirit and scope of the invention.

What is claimed is:

1. A process for preparing organic ether containing isocyanates which comprises reacting a cyanate selected from the group consisting of alkali metal, alkaline earth metal and ammonium cyanates with an alpha-haloether of the formula

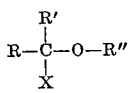

wherein R and R' is selected from the group consisting of hydrogen atoms, hydrocarbon or substituted hydrocarbon radicals containing from 1 to 16 carbon atoms and wherein the substituents on the substituted hydrocarbon radicals are selected from the group consisting of nitro, halo, cyano or 1 to 6 carbon atom alkoxy radicals, R″ is selected from the group consisting of hydrocarbon or substituted hydrocarbon radicals containing from 1 to 16 carbon atoms and wherein the substituents on the substituted hydrocarbon radicals are selected from the group consisting of nitro, halo, cyano or 1 to 6 carbon atom alkoxy radicals, and X is halogen, in the presence of a mixture of organic solvents consisting essentially of a mixture of a highly polar solvent with a hydrocarbon solvent having less than 25 carbon atoms wherein said highly polar solvent has a dielectric constant greater than 15 and is free of Zerewitinoff type active hydrogen atoms.

2. The process of claim 1 wherein R is a hydrogen atom, R' a member selected from the group consisting of a hydrogen atom and a hydrocarbon or substituted hydrocarbon radical containing from 1 to 16 carbon atoms and wherein said hydrocarbon radicals are selected from the group consisting of alkyl or alkenyl radicals and said substituents on said substituted hydrocarbon radical being selected from the group consisting of halo or cyano radicals; R″ is a hydrocarbon or substituted hydrocarbon radical containing 1 to 16 carbon atoms and wherein said hydrocarbon radicals are selected from the group consisting of alkyl or alkenyl radicals and said substituents on said substituted hydrocarbon radical being selected from the group consisting of halo or cyano radicals, and X is chlorine or bromine.

3. The process of claim 1 wherein the alpha-haloalkyl ether is reacted with the cyanates at a temperature from about 0° C. to about 200° C.

4. The process of claim 1 wherein the hydrocarbon solvents are selected from the group consisting of aliphatic, cycloaliphatic, araliphatic and aromatic hydrocarbons.

5. A process for preparing organic ether containing isocyanates according to claim 1 which comprises reacting alphahaloalkyl ethers with a metal cyanate selected from the group consisting of alkali metal, alkaline earth metal and ammonium cyanates at temperatures from about 0° to 200° C. in solvent mixtures comprising from about 0.01 to about 80 volume percent of highly polar solvent and from about 99.99 to about 20 volume percent of hydrocarbon solvent.

6. The process of claim 5 wherein the solvent is a mixture comprising from about 0.01 to about 80 volume percent of a tertiary amide and from about 99.99 to about 20 volume percent of hydrocarbon solvent selected from the group consisting of aliphatic, cycloaliphatic, araliphatic and aromatic hydrocarbons.

7. The process of claim 5 wherein the solvent is a mixture comprising from about 0.01 to about 80 volume percent of a carboxylic acid nitrile and about 99.99 to about 20 volume percent of hydrocarbon solvent selected from the group consisting of aliphatic, cycloaliphatic, araliphatic and aromatic hydrocarbons.

8. The process of claim 5 wherein the solvent is a mixture comprising from about 0.01 to about 80 volume percent of a sulphone selected from the group consisting of dialkyl, dicycloalkyl, aralkyl and diaryl sulphones and from about 99.99 to about 20 volume percent of hydrocarbon solvent selected from the group consisting of aliphatic, cycloaliphatic, araliphatic and aromatic hydrocarbons.

9. A process for preparing alkoxymethylisocyanates of the general formula

wherein R is selected from the group consisting of an alkyl radical having from 1 to 12 carbon atoms, Cl—CH$_2$—CH$_2$— and CH$_2$=CH—CH$_2$— radical, which comprises reacting an alpha-halomethylalkyl ether of the general formula R—O—CH$_2$—X wherein R is defined above and X represents a halogen selected from the group consisting of chlorine and bromine at temperatures of from 0° to about 200° C. with a cyanate selected from the group consisting of an alkali metal, alkaline earth metal and ammonium cyanates in solvent mixtures of from about 0.01 to about 80 volume percent of highly polar solvent and from about 99.99 to about 20 volume percent of a hydrocarbon solvent having less than 25 carbon atoms and being selected from the group consisting of aliphatic, cycloaliphatic, araliphatic and aromatic hydrocarbons and wherein said highly polar solvent has a dielectric constant greater than 15 and is free of Zerewitinoff type active hydrogen atoms.

10. A process for preparing methoxymethyl isocyanate according to claim 9 which comprises reacting methylchloromethyl ether at temperatures of from about 0° to about 200° C. with a cyanate selected from the group consisting of alkali metal, alkaline earth metal and ammonium cyanates at temperatures of from about 0° to about 200° C. in a solvent mixture of from about 0.01 to about 80 volume percent of highly polar solvent and from about 99.99 to about 20 volume percent of hydrocarbon solvent.

11. A process for preparing ethoxymethyl isocyanate according to claim 9 which comprises reacting ethylchloromethyl ether at temperatures of from about 0° to about 200° C. with a cyanate selected from the group consisting of alkali metal, alkaline earth metal and ammonium cyanates in a solvent mixture of from about 0.01 to about 80 volume percent of highly polar solvent and from about 99.99 to about 20 volume percent of hydrocarbon solvent.

12. The process of claim 9 wherein the solvent is a mixture comprising from about 0.01 to about 80 volume percent of tertiary acid amide and from about 99.99 to about 20 volume percent of hydrocarbon solvent selected from the group consisting of aliphatic, cycloaliphatic, araliphatic and aromatic hydrocarbons.

13. The process of claim 9 wherein the solvent is a mixture comprising from about 0.01 to about 80 volume percent of carboxylic acid nitrile and from about 99.99 to about 20 volume percent of hydrocarbon solvent selected from the group consisting of aliphatic, cycloaliphatic, araliphatic and aromatic hydrocarbons.

14. The process of claim 9 wherein the solvent is a mixture comprising from about 0.01 to about 80 volume percent of a sulfone selected from the group consisting of alkyl, dicycloalkyl, aralkyl or diarylsulfones and from about 99.99 to about 20 volume percent of hydrocarbon solvent selected from the group consisting of aliphatic, cycloaliphatic, araliphatic and aromatic hydrocarbons.

15. A process for preparing ethyleneglycol-bis-isocyanatomethyl ether which comprises reacting ethyleneglycol-bis-chloromethyl ether at temperatures of from about 0° to about 200° C. with a cyanate selected from the group consisting of alkali metal, alkaline earth metal and ammonium cyanates in a solvent mixture of from about 0.01 to about 80 volume percent of highly polar solvent and from about 99.99 to about 20 volume percent of a hydrocarbon solvent selected from the group consisting of aliphatic, cycloaliphatic, araliphatic and aromatic hydrocarbons and wherein said highly polar solvent has a dielectric constant greater than 15 and is free of Zerewitinoff type active hydrogen atoms.

16. A process for the production of alkyl-alpha-isocyanatoethyl ethers of the general formula $$R-O-CH-CH_3$$
$$\phantom{R-O-CH-}NCO$$

wherein R is selected from the group consisting of an alkyl radical having from 1 to 12 carbon atoms, and $CH_2=CH-CH_2-$ radical which comprises reacting an alpha-haloethylalkyl ether of the general formula $$R-O-CH-CH_3$$
$$\phantom{R-O-CH-}X$$

wherein R is defined above and X is a halogen selected from the group consisting of chlorine and bromine at temperatures of from about 0° to about 200° C. with a cyanate selected from the group consisting of alkali metal, alkaline earth metal and ammonium cyanates in solvent mixtures of from about 0.01 to about 80 volume percent of highly polar solvent and from about 99.99 to about 20 volume percent of a hydrocarbon solvent having less than 25 carbon atoms and being selected from the group consisting of aliphatic, cycloaliphatic, araliphatic and aromatic hydrocarbons and wherein said highly polar solvent has a dielectric constant greater than 15 and is free of Zerewitinoff type active hydrogen atoms.

17. A process for preparing ethyleneglycol-bis-alpha-isocyanatoethyl ether $$CH_3-CH-O-CH_2-CH_2-O-CH-CH_3$$
$$\phantom{CH_3-CH-}NCO \phantom{-O-CH_2-CH_2-O-CH-}NCO$$

which comprises reacting ethyleneglycol-bis-alpha-halogenethyl ether of the general formula $$CH_3-CH-O-(CH_2)_2-O-CH-CH_3$$
$$\phantom{CH_3-CH-}X \phantom{-O-(CH_2)_2-O-CH-}X$$

wherein X represents a halogen radical selected from the group consisting of Cl and Br at temperatures of from about 0° to about 200° C. with a cyanate selected from the group consisting of alkali metal, alkaline earth metal and ammonium cyanates in solvent mixtures of from about 0.01 to about 80 volume percent of highly polar solvent and from about 99.99 to about 20 volume percent of a hydrocarbon solvent having less than 25 carbon atoms and being selected from the group consisting of aliphatic, cycloaliphatic, araliphatic and aromatic hydrocarbons and wherein said highly polar solvent has a dielectric constant greater than 15 and is free of Zerewitinoff type active hydrogen atoms.

References Cited

UNITED STATES PATENTS 2,340,757  2/1944  Kaase et al. _____ 260—453

FLOYD D. HIGEL, *Primary Examiner.*

D. A. TORRENCE, *Assistant Examiner.*

U.S. Cl. X.R.

260—248, 333, 340.6, 345.1, 465, 465.4, 465.6, 611, 612, 614, 615, 941, 943, 999; 424—211, 283, 298